United States Patent
Horling et al.

(10) Patent No.: US 10,025,868 B1
(45) Date of Patent: *Jul. 17, 2018

(54) PREFERRED SITES

(71) Applicant: Google LLC, Mountain View, CA (US)

(72) Inventors: Bryan C. Horling, Sunnyvale, CA (US); Michael Y. Brukman, Brooklyn, NY (US); Owen Otto, Oakland, CA (US); Philip A. McDonnell, Belmont, CA (US); Kavi J. Goel, San Francisco, CA (US); Paul Haahr, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,868

(22) Filed: Mar. 15, 2016

Related U.S. Application Data

(63) Continuation of application No. 14/061,302, filed on Oct. 23, 2013, now Pat. No. 9,317,563, which is a continuation of application No. 12/351,751, filed on Jan. 9, 2009, now Pat. No. 8,595,228.

(51) Int. Cl.
*G06F 17/30* (2006.01)

(52) U.S. Cl.
CPC .... *G06F 17/30867* (2013.01); *G06F 17/3053* (2013.01); *G06F 17/3097* (2013.01)

(58) Field of Classification Search
CPC ........... G06F 17/30867; G06F 17/3053; G06F 17/3097
See application file for complete search history.

(56) References Cited

U.S. PATENT DOCUMENTS

| | | | | |
|---|---|---|---|---|
| 5,960,409 | A | * | 9/1999 | Wexler ............... G06Q 30/0242 705/14.41 |
| 5,978,799 | A | * | 11/1999 | Hirsch .............. G06F 17/30864 |
| 5,983,214 | A | * | 11/1999 | Lang ................. G06F 17/30702 |
| 6,006,222 | A | | 12/1999 | Culliss |
| 6,009,459 | A | * | 12/1999 | Belfiore ........... G06F 17/30887 707/999.01 |
| 6,014,665 | A | | 1/2000 | Culliss |
| 6,029,161 | A | | 2/2000 | Lang et al. |
| 6,041,326 | A | * | 3/2000 | Amro ................ G06F 17/30867 |
| 6,078,916 | A | * | 6/2000 | Culliss ............. G06F 17/30696 |
| 6,112,212 | A | | 8/2000 | Heitler |
| 6,134,532 | A | * | 10/2000 | Lazarus ........... G06F 17/30867 705/1.1 |
| 6,182,068 | B1 | * | 1/2001 | Culliss ............. G06F 17/30699 707/721 |
| 6,539,377 | B1 | | 3/2003 | Culliss |

(Continued)

OTHER PUBLICATIONS

Google Code. Google Search Appliance/Google Mini, Creating the Search Experience: Best Practices, Dec. 2007, 13 pages. [Retrieved on Oct. 28, 2008]. Retrieved from the Internet http://code.google.com/apis/searchappliance/documentation/52/admin_searchexp/ce_improving_search.html.

*Primary Examiner* — James Trujillo
*Assistant Examiner* — Hubert Cheung
(74) *Attorney, Agent, or Firm* — Fish & Richardson P.C.

(57) ABSTRACT

Methods, systems, and apparatus, including computer program products, for establishing preferences for sites that are explicitly identified by a user by either a textual input or an acceptance in response to a recommendation, and adjusting the presentation of search results based on these preferences.

18 Claims, 8 Drawing Sheets

(56) References Cited

U.S. PATENT DOCUMENTS

| | | | |
|---|---|---|---|
| 6,816,850 B2 | 11/2004 | Culliss | |
| 6,826,574 B1 * | 11/2004 | Colbath | G06F 17/30067 707/733 |
| 6,959,319 B1 * | 10/2005 | Huang | G06F 17/30867 705/14.73 |
| 6,981,040 B1 * | 12/2005 | Konig | G06F 17/30867 707/E17.109 |
| 7,072,888 B1 * | 7/2006 | Perkins | G06F 17/30867 707/733 |
| 7,386,542 B2 | 6/2008 | Maybury et al. | |
| 7,523,096 B2 * | 4/2009 | Badros | G06F 17/30867 705/7.29 |
| 7,827,125 B1 | 11/2010 | Rennison | |
| 7,827,170 B1 * | 11/2010 | Horling | G06F 17/30867 707/722 |
| 7,827,175 B2 | 11/2010 | Plow et al. | |
| 7,827,176 B2 | 11/2010 | Korte et al. | |
| 8,015,170 B2 | 9/2011 | Badros et al. | |
| 8,055,673 B2 * | 11/2011 | Churchill | G06F 17/30867 706/45 |
| 8,200,667 B2 | 6/2012 | Choe et al. | |
| 8,301,764 B2 | 10/2012 | Konig et al. | |
| 8,620,915 B1 | 12/2013 | Brukman et al. | |
| 9,223,895 B2 * | 12/2015 | Chi | G06F 17/30873 |
| 2005/0071328 A1 * | 3/2005 | Lawrence | G06F 17/30867 |
| 2005/0159970 A1 * | 7/2005 | Buyukkokten | G06Q 30/02 705/319 |
| 2005/0240580 A1 * | 10/2005 | Zamir | G06F 17/30867 |
| 2005/0251437 A1 * | 11/2005 | Meuleman | G06F 17/30035 705/7.32 |
| 2005/0278317 A1 * | 12/2005 | Gross | G06F 17/30867 |
| 2007/0156677 A1 * | 7/2007 | Szabo | G06F 17/30522 |
| 2007/0239680 A1 | 10/2007 | Oztekin et al. | |
| 2008/0168032 A1 * | 7/2008 | Criou | G06F 17/30675 |
| 2009/0077033 A1 * | 3/2009 | McGary | G06F 17/3053 |
| 2009/0119294 A1 * | 5/2009 | Purdy | G06F 17/30029 |
| 2009/0265331 A1 * | 10/2009 | Chandrasekar | G06F 17/30867 |
| 2010/0088313 A1 | 4/2010 | Hoffman et al. | |
| 2010/0169297 A1 * | 7/2010 | Haveliwala | G06F 17/30867 707/706 |
| 2010/0280906 A1 | 11/2010 | Lim et al. | |
| 2010/0281036 A1 | 11/2010 | Inoue et al. | |

* cited by examiner

PREFERRED SITES

CROSS-REFERENCE TO RELATED APPLICATION

This application is a continuation of U.S. application Ser. No. 14/061,302, titled "Preferred Sites" filed Oct. 23, 2013, which application is a continuation of U.S. application Ser. No. 12/351,751, titled "Preferred Sites" filed Jan. 9, 2009. The entire content of the foregoing applications are incorporated herein by reference.

BACKGROUND

This specification relates to digital information retrieval, and particularly to processing search results.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources. The search results are typically ordered according to the rank. One example search engine is the Google™ search engine provided by Google Inc. of Mountain View, Calif., U.S.A.

In addition to ordering search results based on the rank of the resources identified response to the query, the search results can be further ordered based on user history data for a user and a profile for the user. If a user has granted permission to let the search engine collect user history data and/or has created a user profile for the search engine, the search engine can process this data to infer user preferences for sites. The search engine uses these inferred user preferences for sites to adjust the order of the search results so that search result that are more likely to be of interest to the user are higher in the order than other search results.

Processes for inferring user preferences for sites, however, may often require a high confidence measure of a user being interested in a particular site before that site is identified as a preferred site. As the user history data on which such inferences are based are inherently noisy data (i.e., click data, bookmarks created for unknown intent), a high confidence measure reduces the likelihood that an inferred user preference for a site is erroneous. However, there are some sites that may be of interest to the user that are never inferred as a preferred site because a high confidence measure for these sites cannot be established. Likewise, inferences can only be drawn where there is evidence to do so. For example, a user might prefer search results that reference a particular company, but if the user never sees that company in a search result, that preference is unlikely to be inferred.

SUMMARY

This specification describes technologies relating to establishing preferences for sites that are explicitly identified by a user or otherwise accepted by a user in response to a recommendation, and adjusting the presentation of search results based on these preferences.

In general, one aspect of the subject matter described in this specification can be embodied in methods that include the actions of accessing user site data associated with a user identifier, the user site data including resource locators of resources; identifying from the resource locators candidate sites for recommendation as preferred sites for association with the user identifier; generating a recommendation score for each of the candidate sites based on per-site user metrics determined from the user site data associated with the user identifier; identifying a candidate site having a recommendation score that exceeds a first recommendation threshold as a recommended site for the user identifier; providing for a user session associated with the user identifier a recommendation to identify the recommended site as a preferred site for the user identifier; generating site preference data identifying the recommended site as a preferred site for the user identifier in response to receiving an explicit acceptance of the recommendation, the preferred site being a site for which a search result that includes a corresponding resource locator referencing the site is eligible for a presentation adjustment in a set of search results; receiving from a search engine a set of search results responsive to a search query received from a user session associated with the user identifier, and each search result including a corresponding resource locator that specifies the location of a corresponding resource; determining that one of the search results includes a corresponding resource locator referencing the preferred site identified in the site preference data and then adjusting the presentation of the search result to generate an adjusted set of search results; and providing the adjusted set of search results for the user session. Other embodiments of this aspect include corresponding systems, apparatus, and computer program products.

Another aspect of the subject matter described in this specification can be embodied in methods that include the actions of identifying from resource locators associated with a user identifier candidate sites for recommendation as preferred sites for association with the user identifier; generating a recommendation score for each of the candidate sites based on per-site user metrics determined from the user site data associated with the user identifier; identifying a candidate site having a recommendation score that exceeds a first recommendation threshold as a recommended site for the user identifier; providing for a user session associated with the user identifier a recommendation to identify the recommended site as a preferred site for the user identifier; and generating site preference data identifying the recommended site as a preferred site for the user identifier in response to receiving an explicit acceptance of the recommendation, the site preference data being provided as input to a search engine that generates a relevance score for a resource in response to a search query associated with the user identifier and based, in part, on the resource being located at a resource locator referencing the preferred site. Other embodiments of this aspect include corresponding systems, apparatus, and computer program products.

Particular embodiments of the subject matter described in this specification can be implemented to realize one or more of the following advantages. Search results that include resource locators that reference a site explicitly identified by a user can be adjusted in presentation relative to other search results. An explicitly identified site is a site that the user either explicitly inputs as a preferred site search preference, or otherwise explicitly accepts as a preferred site search preference in response to a recommendation. As recommended sites must be explicitly accepted by the user, a site recommendation process can recommend sites as preferred sites with a lower degree of confidence than is required for an inference process to infer a site is a preferred site. Ranking adjustments of search results for explicitly identified sites can be done more aggressively than for inferred sites, as there is a high degree of confidence that the user desires to receive search results referencing these explicitly identified sites. A user can easily remove the identification of an explicitly identified site from a list of preferred sites. As a user can input preference data directly, search results for the user can be personalized without the need for extensive monitoring. A user is provided with transparency and control over which sites are preferred.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
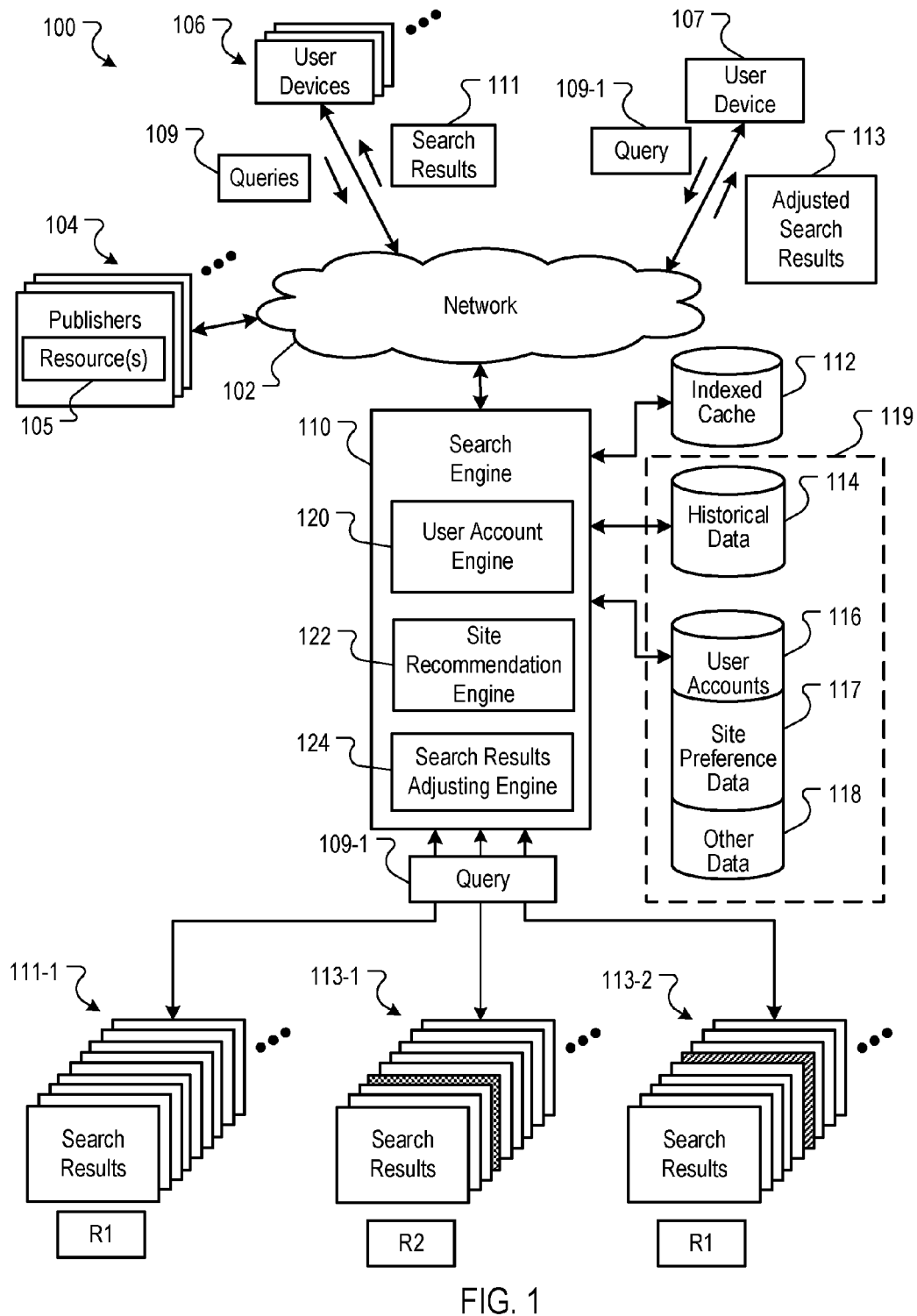
FIG. 1 is block diagram of an example environment in which a search engine provides search services.

FIG. 1 is block diagram of an example environment 100 in which a search engine 110 provides search services. A computer network 102, such as a local area network (LAN), wide area network (WAN), the Internet, or a combination thereof, connects publishers 104, user devices 106, and the search engine 110. The online environment 100 may include many thousands publishers 104 and user devices 106.

A publisher 104 is any web site that hosts and provides electronic access to a resource by use of the network 102. A web site is a one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrase, pictures, and so on, and may include embedded information (such as meta information and hyperlinks) and/or embedded instructions (such as JavaScript scripts).

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of publishers, there are millions of resources available over the network 102. To facilitate searching of these resources, the search engine 110 identifies the resources by crawling the publishers 104 and indexing the resources provided by the publishers 104. The indexed and, optionally, cached copies of the resources are stored in an indexed cache 112.

The user devices 106 submit search queries 109 to the search engine 110. In response, the search engine 110 uses the indexed cache 112 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page.

An exemplary search engine 110 is described in S. Brin and L. Page, "The Anatomy of a Large-Scale Hypertextual Search Engine," Seventh International World Wide Web Conference, Brisbane, Australia (1998) and in U.S. Pat. No. 6,285,999. The search results are ranked based on scores related to the resources identified by the search results, such as information retrieval ("IR") scores, and optionally a separate ranking of each resource relative to other resources ("page rank"). In some implementations, the IR scores are computed from dot products of feature vectors corresponding to a query and a content item, and the ranking of the search results is based on relevance scores that are a combination of the IR scores and page rank scores. The search results 109 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

The queries submitted during the user sessions are stored in historical data 114. The historical data can include query logs, which store queries submitted by users, and click logs, which store data identifying the actions taken by the users using the user devices. The click logs and query logs can be used to map queries submitted during search sessions to resources that were identified in response to the queries and that were selected by the users of the user devices 106.

In some implementations, to protect the privacy of users, the search engine 110 anonymizes the historical data for a user so that the data stored in the historical data 114 cannot be associated with the user. However, if the user opts-in for tracking of the user history data, the search engine 110 can associate search queries and clicks with a user identifier that is uniquely associated with the user. The search engine 110 can optionally associate other data with the user identifier, such as a navigational history of user sessions associated with the user identifier, bookmarks associated with the user identifier, and subscribed feeds associated with the user identifier. Additionally, the search engine 110 can access data associated with the user account and identifier to adjust the presentation order and/or appearance of search results 111 that are provided for a user session associated with a user identifier for the user account. These presentation adjustments can include promoting particular search results, demoting particular search results, highlighting particular search results, and combinations of promoting, demoting, and highlighting search results. These adjustments are based on a list of sites that the user explicitly identifies as being preferred or disfavored.

In some implementations, the search engine 110 includes a user account engine 120, a site recommendation engine 122, and a search results adjusting engine 124 to process and manage explicitly identified sites associated with each user account. Other software architectures that include more or fewer engines or modules can also be used.

The user account engine 120 allows a user to create a user account with the search engine 110. Each user account is keyed to a user identifier that is uniquely associated with a user, and the user identifier is associated with search sessions for its account. A search session is defined by the user logging into the user account when using search engine 110 and is maintained until the user logs out of the account. A user can grant permission to the search engine 110 to track the user's history so that historical data for the user's search sessions and other user data are tracked and associated with the user identifier. At the user's option, the search engine 110 can be configured to track only data approved by the user, such as only search queries and search result selections. The user can clear all historical data associated with the user account 116 at any time, and can opt-out of such tracking at any time.

The user account for the user includes site preference data 117 and other data 118, such as user profile data. The user profile data 118 can include demographic data about the user, the user's country and language, bookmarks, subscribed feeds, and other information about the user.

The site preference data 117 includes data identifying sites explicitly identified by the user as being preferred sites, and that are used to determine whether search results reference preferred sites. A preferred site is a site for which a search result that includes a corresponding resource locator referencing the preferred site is eligible for a presentation adjustment in an ordered set of search results. As used herein, the term "site" is distinct from the term "web site"; the term "site" can refer to an entire web site, a host, or a resource location. In particular, a site can be an entire web site (e.g., all resource locations and hosts having a particular domain name), or a portion of the web site (e.g., a particular host and all resource locations hosted by the host), or a particular resource location hosted within the web site (e.g., a particular URL).

The site preference data 117 are data that identify sites. Site preference data 117 thus include data specifying a particular resource location, a domain name, a host name, or a string of text or expression that matches one or more of a portion of a domain name, host name, or resource locator. Table 1 below provides examples of site preference data 117 and correspondingly identified preferred sites.

TABLE 1

| Site Preference Data | Example | Identified Preferred Sites |
|---|---|---|
| <domain name> | example.com | example.com; All resource locations within this domain |
| <host name> | en.example.com | en.example.com; All resource locations within this host |
| <URL> | www.example.com/blog11.html | The particular resource location defined by the URL |
| <string> | google | Any resource locations that include the string "google", and any domain or host that includes the string "google" in the domain name or host name |
| <directory> | www.example.com/foo | Every resource location under the directory foo, e.g., www.example.com/foo/bar.html |
| <regex> | www\.ex.*\.com | Every web site and resource location that matches the regular expression, e.g., www.exemplar.com; www.exemplar.com/index.html |

The site preference data 117 can be explicitly input by the user using the user account engine 120, and can also be explicitly accepted in response to site recommendations generated by the site recommendation engine 122. A user inputs sites for identification in the site preference data 117 through an interface provided on a search preference page.

The site recommendation engine 122 can interpret the user input to resolve ambiguities and errors. For example, the erroneous host name of "www.exampel.com" can be resolved to "www.example.com." Likewise, localization can be used to reduce the number of hosts identified for domain name resolution. For example, the user input of "example.com" can map to a number of geographic and/or language specific hosts. These geographic and/or language specific hosts are often identified by language codes, such as "en" for English (en.example.com), "jp" for Japanese (jp.example.com), and "ru" for Russian (ru.example.com). If the data associated with the user account indicates that the user resides in a country in which the predominate language used is English, then the input of "example.com" is resolved to "en.example.com."

The site recommendation engine 122 can also provide recommendations to identify recommended sites as preferred sites in the site preference data 117. A recommended site, like a preferred site, can be an entire web site, or a portion of the web site, or a particular resource location. The recommendation can be provided with a search preference page and, in some cases, with the search results 111. The site recommendation engine 122 identifies recommended sites for a user identifier using user site data 119 associated with the user identifier. The user site data 119 include all available, relevant site-related data that are composed of or contain references to resource locators and that are associated with the user identifier. For example, the user site data 119 can include historical data 114 associated with the user identifier, and the user account data 116 associated with the user identifier. This can include search history, web surfing history, news/maps/images history, reader feeds, search engine plug-in modules, and bookmarks associated with the user identifier.

The process of inputting the site preference data 117 and generating recommendations to identify recommended sites in the site preference data 117 is discussed in more detail below.

The search engine 110 generates relevance scores for resources responsive to the query, and associates these relevance scores with corresponding search results 111 that include resource locators that reference the respective resources. The search results adjusting engine 124 compares the resource locators in the search results 111 to identify search results that include resource locators that reference the sites identified in the site preference data 117. The search results 111 that are determined to include resource locators that references the sites identified in the site preference data 117 are eligible for presentation adjustments. If the search results 111 are adjusted in presentation, then an adjusted set of search results 113 that include these presentation adjustments are generated and provided for the user session (i.e., provided to a user device 106 that established the current user session).

For example, the search engine 110 ranks search results 111-1 responsive to a search query 109-1 received from a user session associated with a user identifier according to a first order, R1. This first order R1 does not take into account the site preference data 117 associated with the user identifier. The search results adjusting engine 124 determines which of the search results include corresponding resource locators referencing sites identified in the site preference data 117. In some implementations, a search result having an associated relevance score that exceeds a minimum relevance threshold can be adjusted in the rank to provide adjusted search results 113 results according to a second order R2. For example, the search results 113-1 include a search result having an associated relevance score that exceeds the minimum relevance threshold, and which also includes a resource locator that references a site identified in the site preference data 117. Accordingly, the search result has been boosted to a position fourth from the top-ranked search result (or some other position that can be determined by the search results adjusting engine 124), as indicated by the checkered pattern. The adjusted search result can also include an indication that it is adjusted, such as a textual notice or an icon.

In some implementations, a search result can be highlighted to indicate it references a site identified in the site preference data 117, but not adjusted in the rank. For example, a search result having an associated relevance score that does not exceed a minimum relevance threshold, or, alternatively references a site identified only by a domain name in the site preference data 117, can be highlighted but not adjusted in the rank. Likewise, a search result referencing a site identified in the site preference data 117 may not be adjusted if other search results on the page have been adjusted. For example, the search results 113-2 include a search result having an associated relevance score that does not exceed the minimum relevance threshold, and which also includes a resource locator that references a site identified in the site preference data 117 only by its domain name. Accordingly, the search result has been highlighted, as indicated by the dark lined pattern.

The identification of search results for presentation adjustments and the resulting presentation adjustments are discussed in more detail below.

Figure 2A:
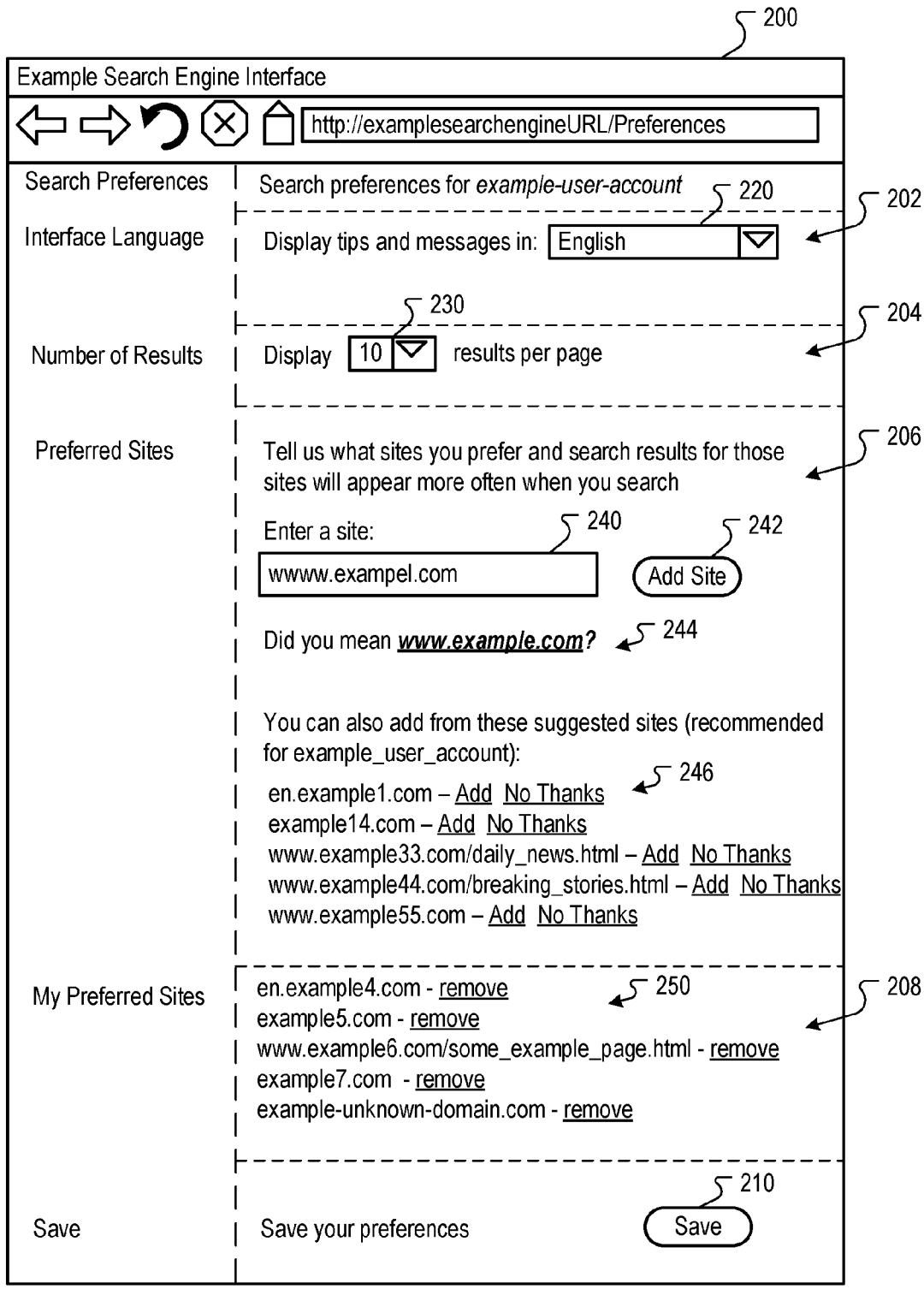
FIG. 2A is a screen shot of an example search preference page.

FIG. 2A is a screen shot of an example search preference page 200. The user can define the search preferences that are associated with the user's user account 116 by use of the search preference page 200. As shown in FIG. 2A, the user account 116 is identified by the identifier "example-user-account."

The search preference page 200 includes an interface language preference input section 202, a number of results preference input section 204, a preferred site input section 206, and a preferred sites listing section 208. Inputs and changes to the preferences are persisted in response to a user selecting the save button 210.

The interface language preference input section 202 allows a user to select an interface language in which messages are displayed. A selectable drop-down menu 220 is used to select a language preferred by the user.

The number of results preference input section 204 allows a user to specify the number of search results that are to be displayed on a search results page. A selectable drop-down menu 230 is used to the number of results preferred by the user.

The preferred sites input section 206 allows a user to explicitly identify sites as preferred sites, or otherwise explicitly accept a recommended site as a preferred site. The sites that are input or accepted are identified in the site preference data 117 associated with the user identifier.

To input sites, a user enters the text of the site that the user prefers in a text input field 240. The site can be identified in the site preference data 117 in response to the user selecting the add site button 242.

As it is likely that users will often provide erroneous or vague text entries, the site recommendation engine 122 error checks the input for a preferred site and resolves the preferred site input to one or more sites. In some implementations, the site recommendation engine 122 resolves the input automatically when there is a high confidence measure for the revision, and provides a user prompt to confirm a revision if there is not a high confidence measure for the revision.

A high confidence measure can be established in a number of different ways. For example, a very close match in edit distance to a known URL, host name or domain name can be automatically resolved to the known URL, host name or domain name. Likewise, a high confidence measure is established when the preferred site input resolves to a most common navigational search result for the user's country and language. For example, the site recommendation engine 122 can access historical data 114 for the user and other users to determine a most common navigational search result for a preferred site input.

If a high confidence measure cannot be established, the site recommendation engine 122 provides the user a prompt to confirm a revision. For example, as shown in FIG. 2A, the prompt 244 is provided for the misspelled input "wwww.exampel.com." Selection of the link "www.example.com" will cause the site recommendation engine 122 generate site preference data 117 identifying the site "www.example.com" as a preferred site for the user.

An example process for revising preferred site textual input is further described with reference to FIG. 3 below.

A recommendation list 246 of recommend sites lists sites that the recommendation engine 122 recommends being identified in the site preference data 117. To accept recommended sites, a user selects one or more of the "Add" link commands in the corresponding recommendation list 246 of recommended sites. To reject recommended sites, the user selects one or more of the "No Thanks" link commands in the corresponding recommendation list 246 of recommended sites. Rejected recommend sites are removed from the list of recommended sites.

The site recommendation engine 122 generates the list of recommended sites for a user identifier using the user site data 119 associated with the user identifier. The site recommendation engine 122 identifies candidate sites from the user site data 119 and scores each candidate site with a recommendation score. If the recommendation score for a corresponding site exceeds a first recommendation threshold, then the corresponding site is identified as a recommended site for the user identifier.

The site recommendation engine 122 can use one of several different processes to generate the site recommendation score. In some implementations, the site recommendation engine 122 bases the recommendation score on a heuristic function that uses per-site user metrics for each candidate site and per-site population metrics for each candidate site as input arguments.

In other implementations, the site recommendation engine 122 bases the recommendation score on a probability that a user will select a search result that references the candidate site. The recommendation score is, in some implementations, the output of a predictive model that is trained using the user site data and similar data associated with many other user identifiers. In some implementations, the prediction is the probability that a user associated with the user identifier will select a search result that references the candidate site and that is presented in a particular position (e.g., fourth in the order of search results).

Example processes for identifying and recommending candidate sites are further described with reference to FIGS. 4 and 5.

The preferred sites listing section 208 provides a preferred site list 250 of preferred sites. Data identifying the preferred sites in the preferred sties list 250 is stored in the site preference data 117 associated with the user account 116. As shown, a preferred site can be identified by a host name (en.example4.com), by a web site (www.example5.com), by a particular URL within a web site (www.example6.com/some-example-page.html), and by a domain name (example7.com). In some implementations, the site preference data 117 can also include data for sites that are unknown to the site recommendation engine (e.g., a site that has just launched and has not been crawled by the search engine 110, or that was otherwise entered incorrectly by the user and could not be resolved to a valid site), such as the listing for "example-unknown-domain.com." Selection of the "remove" link command causes the data identifying the preferred site to be removed from the site preference data 117.

Figure 2B:
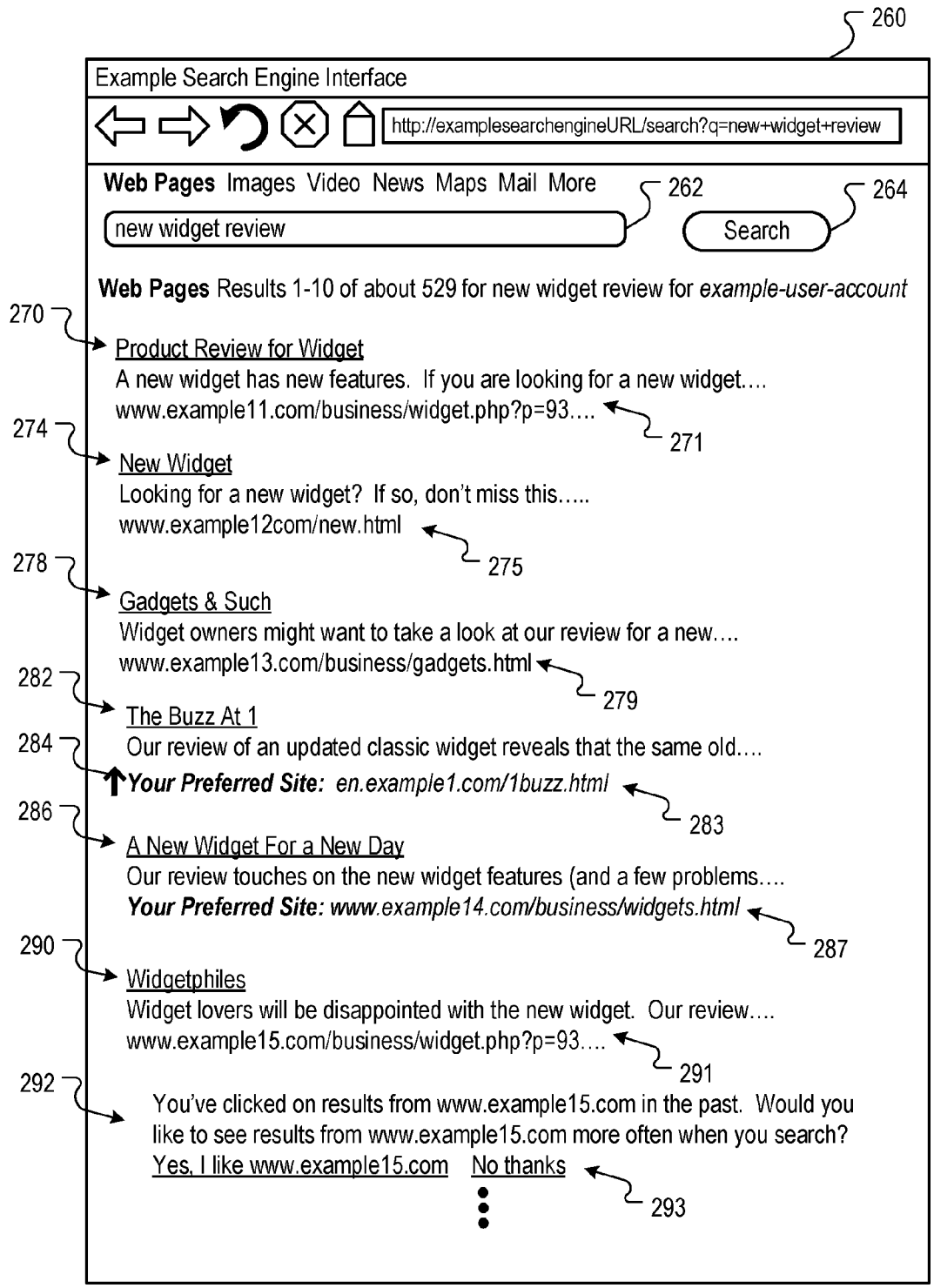
FIG. 2B is a screen shot of a portion of an example search results page.

As described above, recommendations for sites can be provided with the search preference page 200, and, in some implementations, can be provided with a search results page. FIG. 2B is a screen shot of a portion of an example search results page 260. The screen shot of the search results page 260 illustrates how search results that include resource locators referencing preferred sites are adjusted in presentation in the search results page 260, and how a recommendation to identify a recommended site as a preferred site is provided in the search results page 260.

The search results page 260 includes a query input field 262 and a search button 264. Entry of a query into the query input field 262 and selection of the search button 264 causes the query to be submitted to the search engine 110, which, in turn, provides the search results page 260. The search results page 260 indicates that the search results are provided for a user session associated with the user identifier "example-user-account." The search results 270, 274, 278, 282, 286 and 290 are processed by the search results adjusting engine 124 in accordance with the site preference data 117 associated with this user account.

Each of the search results 270, 274, 278, 282, 286 and 290 includes a respective resource locator 271, 275, 279, 283, 287 and 291 specifying the location of a corresponding resource. Each corresponding resource is hosted by a publisher 104.

The search results adjusting engine 124 compares the resource locator 271, 275, 279, 283, 287 and 291 to the site preference data 117 associated with the user identifier "example-user-account." In response to determining that a search result includes a corresponding resource locator referencing one of the sites identified in the site preference data, the search results adjusting engine 124 determines whether to adjust the presentation of the search result.

In some implementations, a presentation adjustment of the search results is an adjustment of the search result in the order of the search results. The search results adjusting engine 124 first determines whether the search result has an associated relevance score that exceeds a minimum relevance score. If so, then the search result is promoted in the rank of the first order so that the search results are ranked according to a second order. In some implementations, a search result that is promoted in the rank can include a visual indication of the promotion. For example, the search result 282 includes an italicized resource locator 283 that includes a note that the site referenced by the resource locator is a preferred site, and also includes a promotion icon 284.

In some implementations, a presentation adjustment of the search results is a visual indication that the search result references a preferred site and the search result is presented in the relative order of the original ranking. For example, the search result 286 includes an italicized resource locator 287 that includes a note that the site referenced by the resource locator is a preferred site. Unlike the search result 282, however, the search result 286 does not include a promotion icon, indicating that the search result 286 is being presented in the relative order of the original ranking, e.g., fourth in the order with respect to search results 270, 274 and 278.

Whether a search result that includes a resource locator referencing a preferred site is promoted and/or highlighted can be based on a number of conditions. These conditions can include a maximum number of search results that can be promoted; whether the search result resource locator references a host name or a domain name; the order of the search result in the first order before any promotions or demotions are made; the relevance score of the search result under consideration to be promoted compared to the relevance score of the search result it would displace; and other conditions. For example, in some implementations, only one promoted search result can be presented on the search result page 260; search results that reference a site identified only by a domain name in the site preference data 117 are only highlighted and not promoted; a search result that is within the top five search results of the first order will not be promoted even if that search result includes a resource locator that references a preferred site; and a search result may not be promoted if the relevance score of the search result is less than a proportional amount of the relevance score of the search result it would displace (e.g., an order of magnitude less).

Example processes for adjusting search results that reference preferred sites are further described with reference to FIGS. 6 and 7 below.

The search result 290 includes a recommendation 292 to identify the site referenced by the search result 290 as a preferred site. The site recommendation engine 122 can provide the recommendation 292 if the site referenced by the resource locator 291 is a recommended site. Selection of one of the corresponding link commands 293 will result in the recommendation being rejected or accepted. In the latter case, the site preference data 117 associated with the user identifier "example-user-account" is updated to identify the recommended site as a preferred site.

Figure 3:
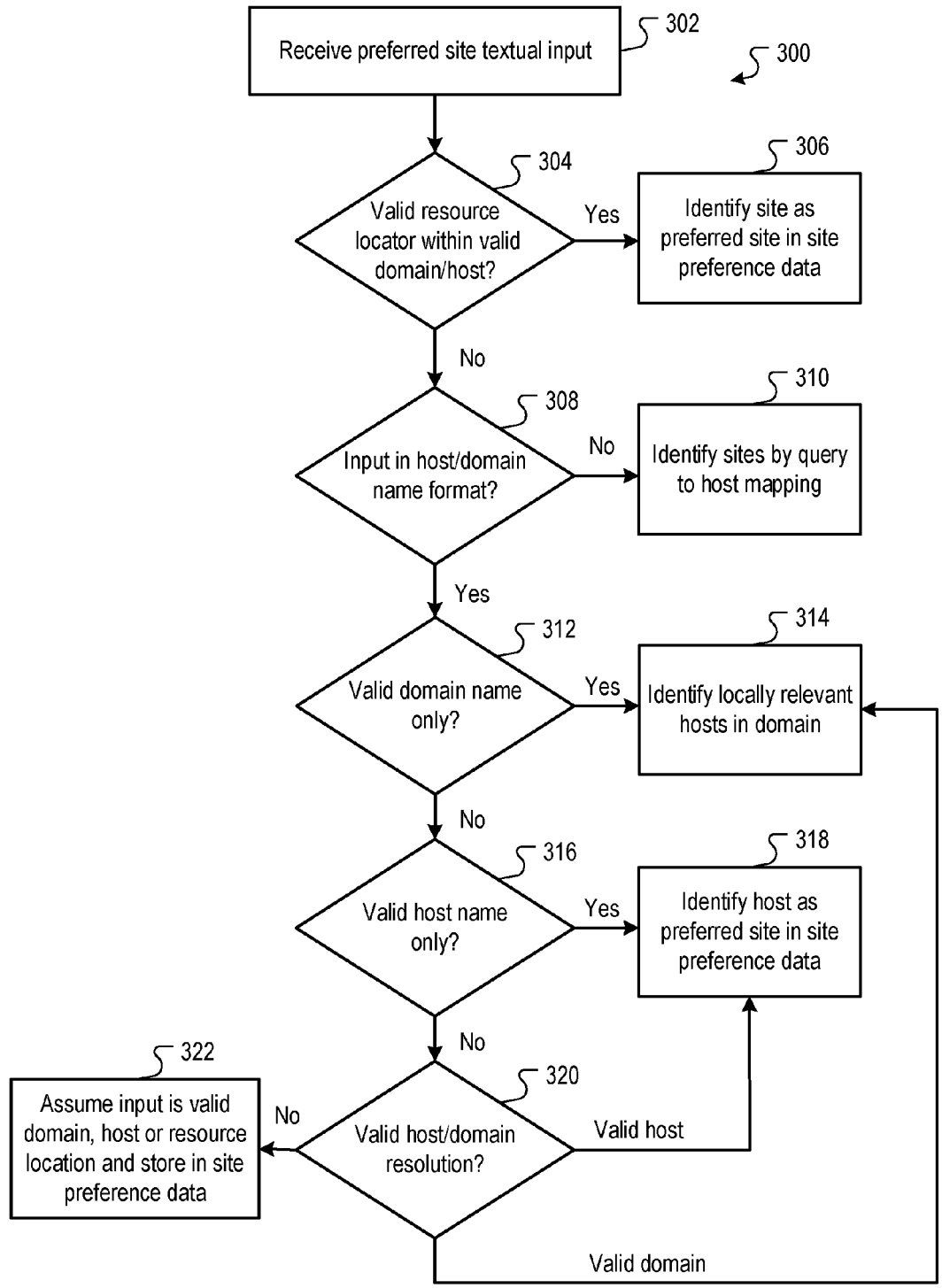
FIG. 3 is a flow diagram of an example process for revising preferred site textual input.

FIG. 3 is a flow diagram of an example process 300 for revising preferred site textual input. The process can be implemented in the site recommendation engine 122.

Preferred site textual input is received (302). For example, text input in the text input field 240 of the search preference page 200 can be provided to the site recommendation engine 122.

The preferred site textual input is processed to determine if it specifies a valid resource locator within a valid domain or host (304). For example, the site recommendation engine 122 compares the preferred site textual input to a uniform resource locator format. A uniform resource locator typically specifies the name of the protocol used to transfer the resource over a network, the name of the machine hosting the resource, and the name of the resource itself, given as a path on the host machine. If the preferred site textual input is in the form that includes at least the name of machine hosting the resource, and the path name of the resource itself, and the site recommendation engine 122 determines if the preferred site textual input specifies a valid resource locator. For example, the site recommendation engine 122 can request the resource, e.g., by issuing an HTTP request, or by checking the index cache 112.

If the preferred site textual input specifies a valid resource locator, then the reference site is identified as a preferred site in the site preference data (306).

If the preferred site textual input does not specify a valid resource locator, then it is processed to determine if it is in a host/domain name format (308). In some implementations, if the preferred site textual input does not conform to a URL format, the site recommendation engine 122 will determine that the preferred site textual input is not in a host/domain name format. For example, a user often may not enter a particular site or URL into the text input field 240; instead, the user may enter a company name or some other text that may be indicative of the site in which the user is interested. Examples of such text include "Major League Baseball" and "Google Maps."

If the preferred site textual input is not in a host/domain name format, then sites are identified by query to host mapping (310). The site recommendation engine 122 processes the preferred site textual input as a query. If the preferred site textual input exhibits the properties of a navigational query, then a navigational host for the preferred site textual input is identified as a preferred site. A navigational query is a query for which the user intent is to identify a specific result responsive to the query. For example, the query "google" is a navigational query for the web site "www.google.com." A query that results in a preponderance of clicks for a particular site relative to other sites can thus be identified as a navigational query. A "click-through" to a site occurs when a user selects a search result that includes a resource locator that references the site. The navigational host for navigational query is the host that receives the largest portion of traffic from the selected search results.

In some implementations, the preferred site textual input is automatically revised to specify the navigational host if there is a high confidence measure established for the navigational host. For example, a high confidence level can be established if the number of click-throughs going to the navigational host exceeds a first threshold percentage, e.g., 60%. Similarly, if the confidence level does not exceed a first threshold percentage but exceeds a second threshold percentage that is less than a first threshold percentage, then the site recommendation engine 122 provides a user prompt to confirm the revision. For example, if the number of click-throughs going to the navigational host exceeds 40% but is less than 60%, the user is prompted to confirm the revision.

In response to an automatic revision, or in response to an acceptance of a recommended revision, the navigational host is identified in the site preference data 117 associated with the user identifier.

If processing preferred site textual input as a query does not result in identifying a navigational host, then an error message can be provided. For example, the site recommendation engine 122, in response to processing the preferred site textual input "aljfdlsjljdldfdoiuj" as a query, can provide an error message indicating the textual input cannot be interpreted to identify any preferred sites.

If the preferred site textual input is in a host/domain name format, then the preferred site textual input is processed determine if it specifies only a valid domain name (312). For example, the site recommendation engine 122 determines if the preferred site textual input specifies only a valid domain name without a resource path.

If the preferred site textual input specifies only a valid domain name, then the locally relevant hosts in the domain are identified (314). For example, the domain name "example.com" can map to a number of geographic and/or language specific hosts, such as ru.example.com, en.example.com, jp.example.com, etc. If the data associated with the user account indicates that the user resides in a country in which the predominate language used is English, then the input of "example.com" is resolved to "en.example.com."

In some implementations, the preferred site textual input is automatically revised to a particular host name if a high confidence measure is established for the particular host name. For example, a high confidence level can be established for the host "en.example.com" if the data associated with the user identifier indicates that the user has a language preference for English, or is otherwise located in a country in which English is a predominate language. If a high confidence measure cannot be established, e.g., the data associated with the user identifier indicates that the user has a language preference for Spanish but is located in a country in which English is the predominant language, the user is prompted to confirm the revision.

One or more locally relevant hosts within a particular domain can be identified and included in the revisions. For example, the preferred site textual input "google.com," can be automatically revised to "finance.google.com" and "labs.google.com."

In some implementations, the domain and the identified locally relevant hosts are identified in the site preference data 117, and the search results adjusting engine 124 is configured to promote the search results that reference the identified hosts and only highlight all other search results that reference other hosts within the domain.

If the preferred site textual input does not specify only a valid domain name, then the preferred site textual input is processed to determine if it specifies only a valid host name (316). For example, the site recommendation engine 122 determines if the preferred site textual input specifies only a valid host name without a resource path.

If the preferred site textual input specifies only a valid host name, then the host is identified as a preferred site in the site preference data (318).

If the preferred site textual input does not specify a valid host name, then the preferred site textual input is processed to determine if there is a valid host or domain name resolution (320). The site recommendation engine 122 can, for example, access the index cache 112 to identify hosts or domains that are close in edit distance to the preferred site textual input. Any host or domain that is within a threshold edit distance can be considered a valid host or domain name resolution. The preferred site textual input can be automatically revised to the valid host or domain name, or the user can be prompted to confirm the revision.

If the preferred site textual input resolves to a valid domain name or host name, then either locally relevant hosts in the domain are identified (314), or the host is identified as the preferred site and the site preference data (318), respectively.

If the preferred site textual input does not resolve to a valid domain name or host name, then the input is assumed to specify a valid domain, host, or resource location, and is stored in the site preference data (322). For example, a user may enter a preferred site textual input that conforms to a domain name format, such as "example-unknown-domain.com." The site recommendation engine 122 may determine that the site is not a valid site and may not be able to identify any possible revisions. The site, however, can still be identified in the site preference data 117. If the site does not exist, then there will be no search results that reference the site and the search results adjustment engine 124 will effectively perform no-ops for the site.

Figure 4:
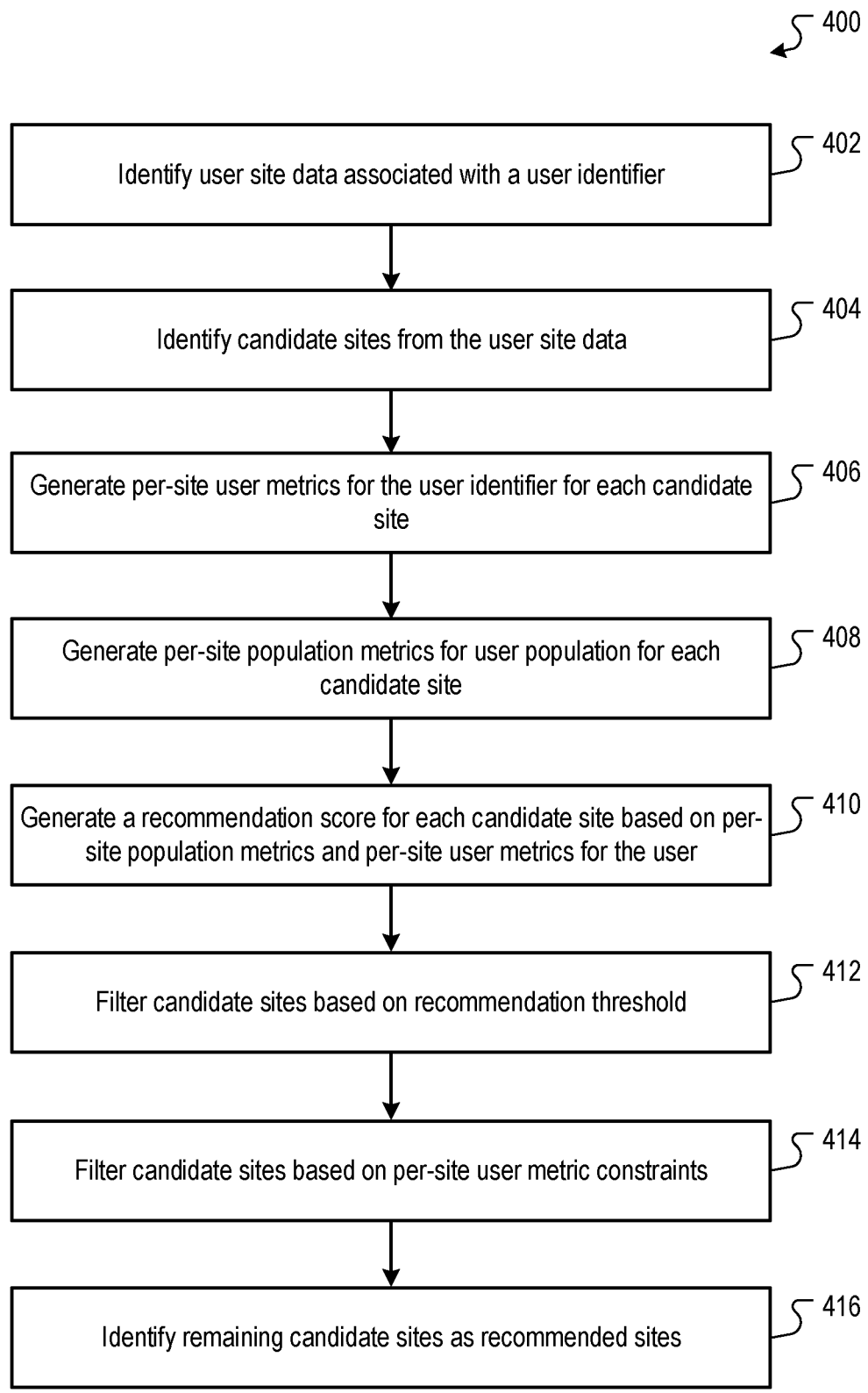
FIG. 4 is a flow diagram of an example process for identifying recommended sites from candidate sites.

FIG. 4 is a flow diagram of an example process 400 for identifying recommended sites from candidate sites. The process 400 can be implemented by the site recommendation engine 122.

User site data associated with a user identifier are identified (402). The user site data include all available, relevant site-related data that are composed of or contain references to resource locators and that are associated with the user identifier. Example user site data include search history data, which can include queries, results, and click data for search results; browser history data, which can include a navigational history associated with the user identifier; map history data, which can include queries for maps and click data related to the maps; image history data, which can include image queries and click data for the resulting images; news history data, which can include news queries, and click data for the resulting news search results; bookmarks associated with the user identifier; subscribed feeds associated with the user identifier; and other data associated with the user identifier and that are composed of or contain references to resource locators.

Candidate sites are identified from the user site data for recommendation as preferred sites for association with the user identifier (404). The site recommendation engine 122 identifies all unique candidate sites that are referenced by the user site data 117. In some implementations, resource locators are grouped according to domain names and only the domain names are identified as candidate sites. In other implementations, resource locators are grouped according to domain names and host names, only the domain names and host names are identified as candidate sites. In still other implementations, a unique candidate site is identified from each unique resource locator, i.e., the unique resource locator defines a candidate site. These implementations can also be combined when identifying candidate sites.

Per-site user metrics for a user are generated for each candidate site (406). The site recommendation engine 122 identifies events from the user site data and generates statistics that measure per-site user metrics associated with the user identifier. For example, the site recommendation 122 can process the user site data to identify, for each site, a click-through rate measuring the rate at which search results that include a corresponding resource locator referencing the candidate site were selected in user sessions associated with the user identifier; a long click-through rate measuring the rate at which search results that include a corresponding resource locator referencing the candidate site received a long click-through in user sessions associated with the user identifier; an impression rate measuring how often search results that include a corresponding resource locator referencing the candidate site appear in search results are provided for a user session associated with the user identifier; and a last-time selection value that measures a time period from a current time to a last time a resource from the candidate site was provided for a session associated with the user identifier. Other per-site user metrics can also be determined. A long click-through for a site is defined as a click-through for a site that results in either subsequent clicks on that site during the same user session or the same user session persisting on that site for predefined time period, e.g., 30 seconds.

Per-site population metrics for a user population for each candidate site are generated (408). The site recommendation engine 122 generates per-site population metrics for each of the candidate sites based on similar data for large population of users. In some implementations, per-site population metrics are generated for all indexed sites on a periodic basis, e.g., weekly or monthly. For each site, the site recommendation 122 generates aggregated user statistics that measure per-site population metrics, such as a click-through rate measuring the rate at which the search results that include a corresponding resource locator referencing the candidate site were selected in user sessions associated with the population of user identifiers; a long click-through rate measuring the rate at which long click-throughs to the candidate site occur from search results that included a corresponding resource locator referencing the candidate site; an impression rate measuring how often search results that include a corresponding resource locator referencing the candidate site appear in search results are provided to the user; and a query count measuring how many distinct queries result in the candidate site being identified in search results, e.g., how many distinct queries return a search result including a resource locator that references the site for an average user. Other per-site population metrics can also be used.

A recommendation score is generated for each candidate site based on the per-site population metrics and the per-site user metrics (410). In some implementations, the site recommendation engine 122 bases the recommendation score on a heuristic function that receives the per-site user metrics for each candidate site and per-site population metrics for each candidate site as input arguments. The heuristic function can be configured to generate for a candidate site a recommendation score that is proportional to the number of times the candidate site has been requested for user sessions associated with the user identifier and associated with other user identifiers, how long ago the candidate site was requested for a user session associated with the user identifier, a long click-through rate for the candidate site associated with the user identifier and with other user identifiers, and other per-user metrics that are a signal of interest of a user associated with the user identifier and users associated with other user identifiers. For example, the following function can be used to generate a recommendation score RS:

$$RS = f4(f1(\text{user interests metrics}), f2(\text{traffic metrics}), f3(\text{query metrics}))$$

The function f4 returns a recommendation score based on the score components generated by the functions f1, f2 and f3. In some implementations, the function f4 is a summation of the score components of f1, f2 and f3. In other implementations, the score components of f1, f2 and f3 can be weighted. In other implementations, the output of the function f4 can be the product of the score components of f1, f2 and f3. Other functions for f4 can also be used, and more or fewer score components can be used.

The function f1 outputs a score component proportional to user interest metrics associated with a user identifier relative to the interest metrics of a user population. User interest metrics are metrics associated with user events that are a signal of user interest, or lack of user interest, for a site. Example interest metrics include click-through rates, including long click-through rates; whether the site is bookmarked; how often the site is navigated to in response to a direct entry of the resource locator for the site; how long ago the site was visited in a session associated with the user identifier; and how frequently the site is visited during sessions associated with the user identifier, to name just a few. The score component increases as metrics associated with the user identifier indicate a higher degree of user interest for the candidate site during sessions associated with that user identifier and sessions from the user population.

The function f2 outputs a score component inversely proportional to traffic metrics for the site. Traffic metrics are metrics associated with the traffic from navigation and searches for a site. A particular host may host thousands of resources in a user-contributed encyclopedia. As a result, the host may be referenced in many search results, as the host name is associated with many resources that cover a variety of different interests and topics. Accordingly, it is likely that the interactions associated with any one user identifier indicate a high level of user interest for search results that reference this host name. However, the interactions associated with many other user identifiers likewise indicate a similar high level of interactions. Accordingly, it will be of little benefit to recommend this site as a preferred site, as it is likely that this site is often referenced in search results, and it is likely referenced in many search results that are highly ranked.

The function f3 outputs a score component that is proportional to query metrics. Query metrics are metrics associated with query diversity of queries submitted during user sessions that result in identification and selection of the site in a search result. Assume a particular site is most frequently identified in response to a navigational query for that site, and relatively few other queries are used to identify the site. Additionally, assume that the search results referencing the site are most often selected when the navigation query is used to identify the site, and is rarely selected when other queries are used to identify the site. Such query metrics indicate that the user population has associated the site with a navigational query. Accordingly, it will be of little benefit to recommend this site as a preferred site, as it is likely that the user will use a navigational query for that particular site.

The recommendation score can also be based on additional or different functions that use per-site metrics as input. The functions can be linear or non-linear functions. In some implementations, the functions are fitted to generate recommendations scores that result in sites already identified by users as being recommended sites. For example, the function outputs can be the result of a plurality of feature weights, and the feature weights can be adjusted to so that preferred sites entered by users in the text input field 240 of the search preference page 200 are scored at or above a recommendation threshold. Thereafter, the functions can be applied to candidate sites for each user identifier.

In other implementations, the site recommendation engine 122 bases the recommendation score on a probability that a user will select a search result that references the candidate site. The recommendation score is, in some implementations, the output of a predictive model that is trained using the user site data and similar data associated with many other user identifiers. The predictive model can use one of many known linear or non-linear regression models, such as logistic regression. For example, the user site data and similar data associated with many other user identifiers is partitioned into a training set and a testing set, and a predictive model is trained on the training set. Once the predictive model is trained, the model is tested on the testing set. The training and testing process continues until the predictive model predicts the probability of user actions associated with the user identifier to an acceptable degree of accuracy. In some implementations, the prediction is the probability that a user associated with the user identifier will select a search result that references the candidate site and that is presented in a particular position (e.g., fourth in the order of search results).

Other processes for recommending sites from candidate sites can also be used.

Candidate sites are filtered based on a recommendation threshold (412). The recommendation threshold can be a minimum recommendation score.

Candidate sites are filtered based on per-site user metrics (414). For example, for the site recommendation engine 122 to consider a candidate site a recommended site, one or more per-site user metrics must be satisfied. For example, candidate sites can include resource locations, hosts and/or domains from which a resource has never been selected or requested for a user session associated with the user identifier. To preclude such candidate sites from being identified as recommended sites, the site recommendation engine 122 can require that a search result referencing the candidate site must have been clicked on at least once in a search session associated with the user identifier. Other filtering based on per-site user metrics can include the candidate site being identified in a non-search related event, such as browser history or bookmarks.

The remaining candidate sites are identified as recommended sites (416). The site recommendation engine 122 orders all recommended sites by their recommendation scores. In some implementations, only the most highly rated sites, e.g., the top 30 sites in the order, are associated with the user identifier. For example, the most highly rated sites can be stored in the other data 118 of the user account associated with the user identifier. These recommended sites are then recommended in user sessions either in the search preferences page 200, and or in the search results page 260.

Figure 5:
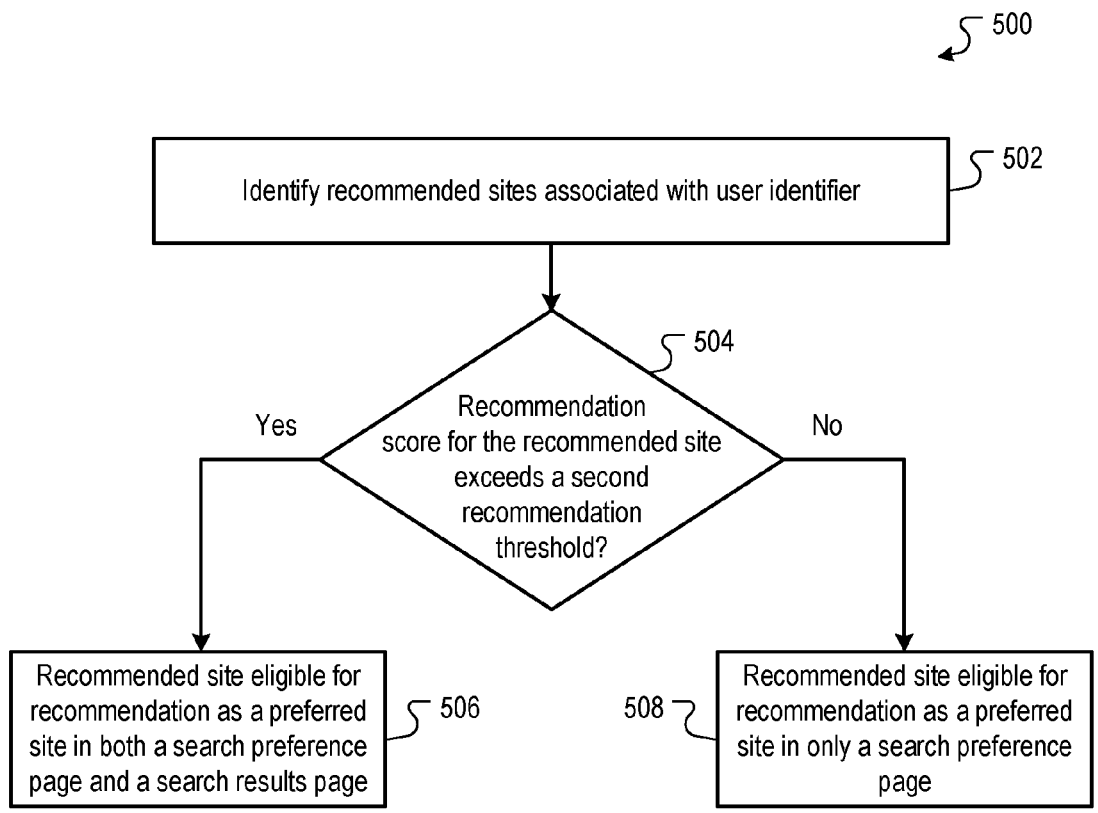
FIG. 5 is a flow diagram of an example process for recommending sites for inclusion as preferred sites for a user identifier.

FIG. 5 is a flow diagram of an example process 500 for recommending sites for inclusion as preferred sites for a user identifier. The process 500 can be implemented by the site recommendation engine 122.

Recommended sites associated with a user identifier are identified (502). For example, the site recommendation engine 122 identifies the recommended sites identified by the process 400 and associated with the user identifier.

For each site, the recommendation score for the recommended site is compared to a second recommendation threshold to determine if the recommendation score exceeds the second recommendation threshold (504). For example, the site recommendation engine 122 compares the recommendation score of a recommended site to a second recommendation threshold that is greater than the first recommendation threshold used to identify candidate sites as a recommended sites.

If the recommendation score exceeds the second recommendation threshold, then the recommended site is determined to be eligible for recommendation as a preferred site in both a search preference page and a search results page (506). For example, the site recommendation engine 122 can recommend the site be identified as a preferred site in the search preference page 200 and the search results page 260. In some implementations, the recommendations in the search results page are throttled so that recommendations are made infrequently so as not to distract the user from the substance of the search results page 260. For example, in some implementations, a recommendation for user sessions associated with the user identifier can be provided no more than once for every five search results pages provided. Additionally, recommendations can be further throttled on a per-site basis. For example, in some implementations, a recommendation for user sessions associated with a user identifier can be provided for a particular site no more than once for every three recommendations provided.

Conversely, if the recommendation score does not exceed the second recommendation threshold, then the recommended site is determined to be eligible for recommendation as a preferred site in only the search preference page (508). In some implementations, all recommended sites are listed in the recommendation list 246 on the search preference page 200. In other implementations, only a predefined number, e.g., five, recommendation sites are listed in the recommendation list 246. The five recommended sites with the highest recommendation scores are shown in the recommendation list 246, and if after a predefined period a recommended site is not selected, the unselected recommended site is replaced with another recommended site. The predefined period can be a number of views of the preference page 200, or a time period.

Figure 6:
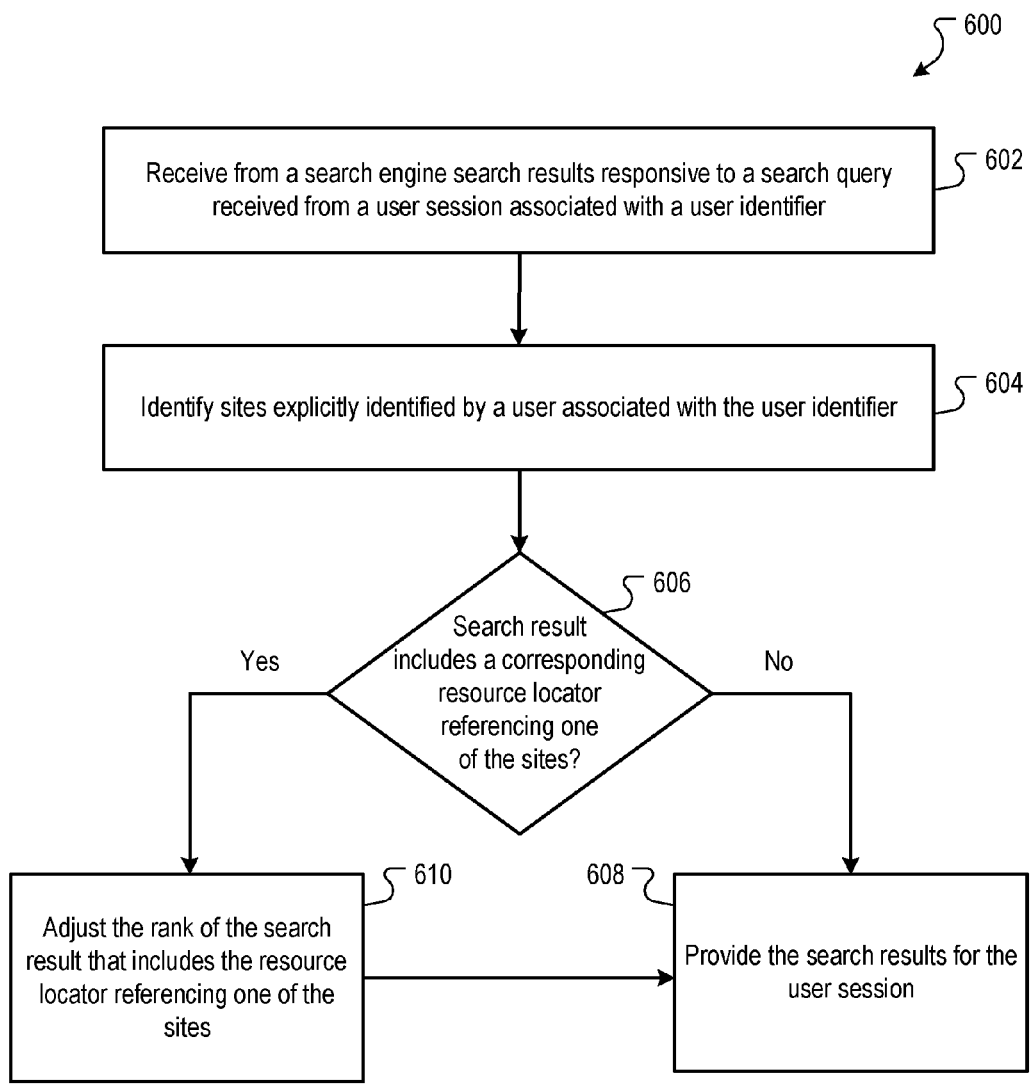
FIG. 6 is a flow diagram of an example process for adjusting search results that reference preferred sites.

FIG. 6 is a flow diagram of an example process 600 for adjusting search results that reference preferred sites. The process 600 can be used in the search results adjusting engine 124.

Search results responsive to a search query are received (602). The search results are received from the search engine 110, and are responsive to a search query received from a user session associated with the user identifier. The search results are ranked according to a first order, and each search result includes a corresponding resource locator that specifies the location of a corresponding resource.

Sites explicitly identified by a user associated with the user identifier are identified (604). The search results adjusting engine 124, for example, accesses the site preference data 117 associated with the user identifier to identify the sites.

The search results are compared to the identified sites to determine if the search results include a corresponding resource locator referencing one of the identified sites (606). The search results adjusting engine 124 compares the resource locators in each of the search results to the site preference data 117 associated with the user identifier. A search result references identified sites in the site preference data 117 if the resource locator exactly matches a resource identified in the site preference data, or includes a host name, domain name, or some other textual string identified in the site preference data 117. FIG. 7 below describes an example process of determining whether a search result includes a corresponding resource locator referencing a site identified in the site preference data 117.

If none of the search results include corresponding resource locators referencing the identified sites, then the search results are provided for the user session (608). The search results adjusting engine 124 will not adjust the search results based on the site preference data 117, and the search results are provided according to the first order. In some implementations, the search results could be adjusted according to other adjustment criteria, such as user filters or inferred personalization adjustments based on sites that are not explicitly identified for a user identifier.

If a search result includes a corresponding resource locator referencing one of the identified sites, then the rank of the search result is adjusted (610). The search results adjusting engine 124 can adjust the rank of the search result that includes the corresponding resource locator referencing one of the sites so that the search results are ordered according to a second order. In some implementations, each search result has an associated relevance score that measures the relevance of the query to the corresponding resource specified by the corresponding resource locator. The search results adjusting engine 124 adjusts the rank of the search result only if the relevance score associated with the search result exceeds a relevance score threshold. In some implementations, the relevance score threshold can be a predefined value that is the same for all search results. In other implementations, the relevance score threshold can be a value that is proportional to the relevance score of a search result that is under consideration for being displaced. For example, for a first search result to be promoted, the relevance score of the first search result can be no less than an order of magnitude smaller than the relevance score of a second search result that the first search result would displace.

In some implementations, the search results adjusting engine 124 adjusts the rank of the search result so that search result is positioned a predetermined number of positions below a top ranked search result, e.g., no higher than fourth in the second order. Display data can be generated so that causes a user device to display a visual indication that the search result is an adjusted search result.

In some implementations, the search results adjusting engine 124 adjusts the actual relevance score associated with the search result so that the search result is promoted to a predefined position in the second order, e.g., fourth from the top. For example, the relevance scores associated with the third search result and the fourth search result in the first order can be compared to the relevance score of the search result that is to be promoted to the fourth position. The relevance score of the search result that is to be promoted can then be adjusted so that it is greater than the relevance score of the fourth search result in the first order and less than the relevance score of the third search result in the first order. Other processes to promote search results to particular positions can also be used.

The search results ordered according to the second order are then provided for the user session (608). For example, the search results ordered according to the second order can be provided to a user device on which a user session associated with the user identifier has been established.

Figure 7:
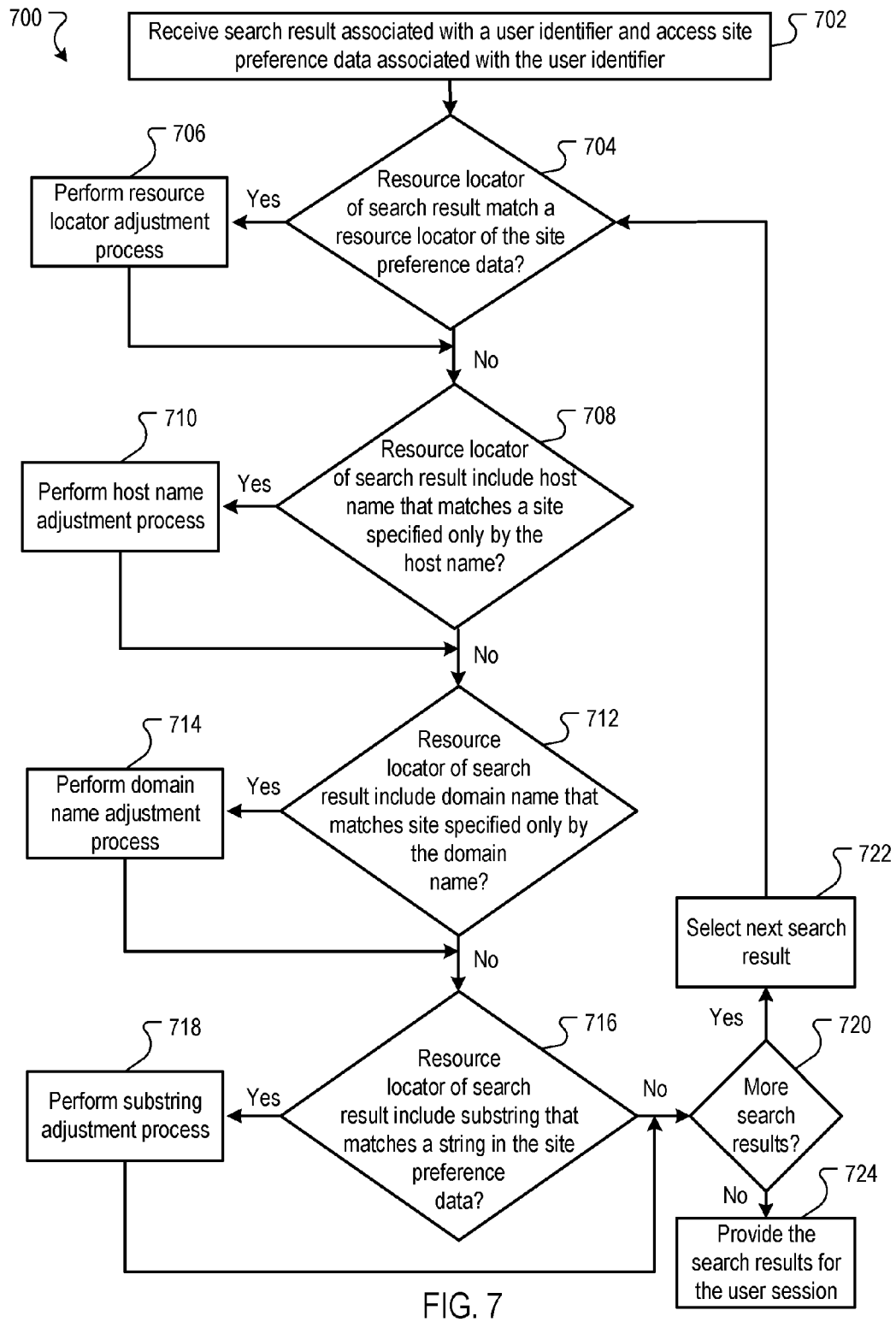
FIG. 7 is a flow diagram of an example process for determining whether a search result includes a corresponding resource locator referencing a site identified in the site preference data.

FIG. 7 is a flow diagram of an example process 700 for determining whether a search result includes a corresponding resource locator referencing a site identified in the site preference data. The process 700 can be used in the search results adjusting engine 124.

Search results associated with the user identifier are received, and site preference data associated with the user identifier are accessed (702). The search results ranked according to a first order are received from the search engine 110, and are responsive to a search query received from a user session associated with the user identifier.

A search result is compared to the site preference data to determine if the search result includes a resource locator that matches a resource locator identified in the site preference data (704). A resource locator of a search result matches a resource locator of the site preference data 117 if both resource locators specify the same host name and path name of a resource.

If a search result includes a resource locator that matches a resource locator identified in the site preference data, then a resource locator adjustment process is performed (706). A resource locator adjustment process promotes a search result, provided one or more promotion conditions do not preclude promotion of the search result. For example, if no other search results have been promoted, or less than a predefined number of maximum search results have been promoted, then search result can be promoted. Other adjustment processes based on matching resource locators can also be performed.

A search result is compared to the site preference data to determine if the search result includes a resource locator that matches a site specified only by the host name in the site preference data (708). If a search result includes a resource locator having a host name that matches a host name specified in the site preference data, then a host name adjustment process is performed (710). A host name adjustment process promotes a search result, provided one or more promotion conditions do not preclude promotion of the search result. For example, if no other search results have been promoted, or less than a predefined number of maximum search results have been promoted, then the search result can be promoted. Other adjustment processes based on matching host names can also be performed.

A search result is compared to the site preference data to determine if the search result includes a resource locator that matches a site specified only by the domain name in the site preference data (712). If the search result includes a resource locator having a domain name that matches a domain name specified in the site preference data, then a domain name adjustment processes is perform (714). In some implementations, a domain name locator adjustment process can highlight all search results that include a resource locator referencing the identified domain, but only promote search results that include resource locators referencing locally relevant hosts within the identified domain. Other adjustment processes based on matching domain names can also be performed. The domain name adjustment process promotes a search result provided one or more promotion conditions do not preclude promotion of the search result.

A search result is compared to the site preference data to determine if the search result includes a resource locator having a substring that matches a string in the site preference data (716). For example, the site preference data 117 may specify a site only by a textual string that is not in the format of a resource locator, domain name, or host name, e.g., the textual string "google."

If a search result includes a resource locator having a substring matching a string in the site preference data, then a substring adjustment process is performed (718). In some implementations, the substring adjustment process includes resolving the substring to a valid host name or domain name that includes the substring as part of the host name or domain name, and performing either the host name adjustment process or the domain name adjustment process as appropriate.

The search results are checked to determine if additional search results remain to be processed (720). For example, in a set of search results identified by the search engine 110, the first 100 search results can be checked against the site preference data to determine if any presentation adjustments are necessary.

If additional search results remain to be processed, then the next search result is selected (722), and the process is repeated. Otherwise, the search results are provided for the user session (724).

The example processes of recommending preferred sites and adjusting search results that reference preferred sites described herein are not exhaustive. For example, in addition to promoting search results that reference preferred sites, the example processes herein can be used to demote search results that reference sites that the user has indicated are disfavored. The search preferences page 200, for example, can include an additional preference input in which the user can specify sites that are disfavored. Such disfavored sites can be demoted in the search results if the disfavored sites exceed a relevance threshold. In some implementations, disfavored sites are demoted so that no disfavored sites will be referenced by search results on the first page of search results received for a user session.

In some implementations, the search engine can include a site restriction command so that search results are restricted only to the preferred site specified by the user. For example, some user identifiers may have a large number of preferred sites specified in the associated site preference data 117. In those situations, users may desire to search only their preferred sites for specific queries. An example site restriction command is "site:pref" preceding a search query.

In some implementations, search results sites that have been explicitly input by the user (i.e., entered into the site input field 240 of the search preference page 200) are prioritized for promotion over recommended sites that have been explicitly accepted by the user. For example, if the search results page can have no more than three promoted sites, then search results referencing recommended sites accepted by the user can be promoted only if there are less than three promoted search results referencing sites explicitly input by the user.

Adjusting the search results that reference sites explicitly identified by the user can be done in conjunction with other search results adjustment algorithms. In some implementations in which multiple search results adjustment algorithms are performed, the adjustment of search results based on site preference data is performed last. This is because the explicit selections of these sites by the user are very strong signals that the user desires search results referencing these sites to be shown first.

The example implementations in this specification describe the adjustment of the ranking of search results that are initially received in a first order. However, the search engine 110 can, in other implementations, use the site preference data 117 when determining relevance scores for resources and return search results in a first order that takes into account the site preference data 117. For example, the site preference data 117 can be provided as input to the search engine 110 for a search query associated with a user identifier. The search engine 110 then generates relevance scores for resources based, in part, on the resources being located at resource locators referencing the preferred sites. These relevance scores are then used to generate the search results in a first order that takes into account the site preference data associated with the user identifier.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus, the method comprising:

accessing site preference data associated with a user identifier, the site preference data identifying preferred sites for the user identifier, each preferred site having been identified in response to receiving an explicit acceptance of a recommendation during a first user session associated with the user identifier, where each preferred site is specified in the site preference data by only a domain name, where only search results that reference the domain name of a preferred site and include a resource locator referencing a locally relevant host within the domain, wherein the host is locally relevant to a location associated with the user identifier, for a second user session associated with the user identifier and that is subsequent to the first user session is eligible for a presentation adjustment when the search result is presented to a user device associated with the user identifier; and providing, in a second user session associated with the user identifier, a search results page that includes a first search result in a set of multiple search results, wherein the first search result references one of the preferred sites identified in the site preference data, and including in the search results page a visual indicator that the first search result references the one of the preferred sites, wherein the visual indicator includes presenting text of an address of a resource that includes the preferred site in a text format that is different from a text format that is used to present addresses of resources that do not include the preferred site.

2. The method of claim 1, further comprising adjusting a ranking of the first search result in the set of search results based on the first search result referencing one of the preferred sites.

3. The method of claim 1, wherein each preferred site is a uniform resource locator.

4. The method of claim 1, further comprising:

accessing user site data associated with the user identifier, the user site data including resource locators of resources that were selected at least once for a third user session associated with the user identifier, the third user session occurring before the first user session;

identifying, from the resource locators, candidate sites for recommendation as preferred sites, each candidate site being specified by at least one of the resource locators included in the accessed user site data, the identifying comprising grouping resource locators by domain names and, for each domain name, selecting the domain name as a candidate site;

identifying a recommended site from one of the identified candidate sites;

providing, in the first user session associated with the user identifier, a search results page that includes a search result that references the recommended site, and including in the search results page a recommendation to identify the recommended site as a preferred site; and generating the site preference data identifying the recommended site as a preferred site for the user identifier in response to receiving an explicit acceptance of the recommendation during the second user session associated with the user identifier.

5. The method of claim 1, wherein the text format used for presenting the address of the resource that includes the preferred site is an italicized text format.

6. The method of claim 1, wherein the host is locally relevant to the location associated with the user identifier based on a geographic location associated with the user identifier.

7. The method of claim 1, wherein the host is locally relevant to the location associated with the user identifier based on a preferred language associated with the user identifier.

8. A system for processing search results, comprising:

a data store storing user site data associated with a user identifier, the user site data including resource locators of resources; and instructions stored on a non-transitory computer readable medium and executable by a data processing apparatus to cause the data processing apparatus to perform operations comprising:

accessing site preference data associated with a user identifier, the site preference data identifying preferred sites for the user identifier, each preferred site having been identified in response to receiving an explicit acceptance of a recommendation during a first user session associated with the user identifier, where each preferred site is specified in the site preference data by only a domain name, where only search results that reference the domain name of a preferred site and include a resource locator referencing a locally relevant host within the domain, wherein the host is locally relevant to a location associated with the user identifier, for a second user session associated with the user identifier and that is subsequent to the first user session is eligible for a presentation adjustment when the search result is presented to a user device associated with the user identifier; and providing, in a second user session associated with the user identifier, a search results page that includes a first search result in a set of multiple search results, wherein the first search result references one of the preferred sites identified in the site preference data, and including in the search results page a visual indicator that the first search result references the one of the preferred sites, wherein the visual indicator includes presenting text of an address of a resource that includes the preferred site in a text format that is different from a text format that is used to present addresses of resources that do not include the preferred site.

9. The system of claim 8, further comprising adjusting a ranking of the first search result in the set of search results based on the first search result referencing one of the preferred sites.

10. The system of claim 8, wherein each preferred site is a uniform resource locator.

11. The system of claim 8, further comprising:
accessing user site data associated with the user identifier, the user site data including resource locators of resources that were selected at least once for a third user session associated with the user identifier, the third user session occurring before the first user session;
identifying, from the resource locators, candidate sites for recommendation as preferred sites, each candidate site being specified by at least one of the resource locators included in the accessed user site data, the identifying comprising grouping resource locators by domain names and, for each domain name, selecting the domain name as a candidate site;
identifying a recommended site from one of the identified candidate sites;
providing, in the first user session associated with the user identifier, a search results page that includes a search result that references the recommended site, and including in the search results page a recommendation to identify the recommended site as a preferred site; and
generating the site preference data identifying the recommended site as a preferred site for the user identifier in response to receiving an explicit acceptance of the recommendation during the second user session associated with the user identifier.

12. The system of claim 8, wherein the text format used for presenting the address of the resource that includes the preferred site is an italicized text format.

13. The system of claim 8, wherein the host is locally relevant to the location associated with the user identifier based on a geographic location associated with the user identifier.

14. The system of claim 8, wherein the host is locally relevant to the location associated with the user identifier based on a preferred language associated with the user identifier.

15. A computer program product, encoded on a non-transitory computer readable medium, configured to cause a data processing apparatus to perform operations comprising:
accessing site preference data associated with a user identifier, the site preference data identifying preferred sites for the user identifier, each preferred site having been identified in response to receiving an explicit acceptance of a recommendation during a first user session associated with the user identifier, where each preferred site is specified in the site preference data by only a domain name, where only search results that reference the domain name of a preferred site and include a resource locator referencing a locally relevant host within the domain, wherein the host is locally relevant to a location associated with the user identifier, for a second user session associated with the user identifier and that is subsequent to the first user session is eligible for a presentation adjustment when the search result is presented to a user device associated with the user identifier; and
providing, in a second user session associated with the user identifier, a search results page that includes a first search result in a set of multiple search results, wherein the first search result references one of the preferred sites identified in the site preference data, and including in the search results page a visual indicator that the first search result references the one of the preferred sites, wherein the visual indicator includes presenting text of an address of a resource that includes the preferred site in a text format that is different from a text format that is used to present addresses of resources that do not include the preferred site.

16. The computer readable medium of claim 15, wherein the text format used for presenting the address of the resource that includes the preferred site is an italicized text format.

17. The computer program product of claim 15, wherein the host is locally relevant to the location associated with the user identifier based on a geographic location associated with the user identifier.

18. The computer program product of claim 15, wherein the host is locally relevant to the location associated with the user identifier based on a preferred language associated with the user identifier.

* * * * *

UNITED STATES PATENT AND TRADEMARK OFFICE
CERTIFICATE OF CORRECTION

PATENT NO. : 10,025,868 B1
APPLICATION NO. : 15/070868
DATED : July 17, 2018
INVENTOR(S) : Horling et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this
Twenty-third Day of April, 2019

Andrei Iancu
*Director of the United States Patent and Trademark Office*